(12) United States Patent
Yu et al.

(10) Patent No.: US 12,409,414 B2
(45) Date of Patent: Sep. 9, 2025

(54) METHOD FOR ZERO DISCHARGE TREATMENT OF DESULFURIZATION WASTEWATER SUITABLE FOR MULTIPLE WORKING CONDITIONS

(71) Applicant: Xi'an Boiler & Environmental Protection Engineering Co., Ltd., Shaanxi (CN)

(72) Inventors: Fusheng Yu, Xi'an (CN); Huijie Dan, Xi'an (CN); Guoping Niu, Xi'an (CN); Yongjun Niu, Xi'an (CN); Ming Lei, Xi'an (CN); Dingbang Wang, Xi'an (CN); Haoran Guo, Xi'an (CN); Shaoliang Wang, Xi'an (CN); Zhenjing Shi, Xi'an (CN)

(73) Assignee: Xi'an Boiler & Environmental Protection Engineering Co., Ltd., Xi'an (CN)

( * ) Notice: Subject to any disclaimer, the term of this patent is extended or adjusted under 35 U.S.C. 154(b) by 180 days.

(21) Appl. No.: 17/902,933

(22) Filed: Sep. 5, 2022

(65) Prior Publication Data

US 2023/0017568 A1    Jan. 19, 2023

Related U.S. Application Data

(63) Continuation of application No. PCT/CN2020/122579, filed on Oct. 21, 2020.

(30) Foreign Application Priority Data

Aug. 14, 2020 (CN) .......................... 202010819367.1

(51) Int. Cl.
   *C02F 1/16* (2023.01)
   *B01D 21/26* (2006.01)
   (Continued)

(52) U.S. Cl.
   CPC ........... *B01D 53/80* (2013.01); *B01D 21/267* (2013.01); *B01D 53/1425* (2013.01);
   (Continued)

(58) Field of Classification Search
   None
   See application file for complete search history.

(56) References Cited

U.S. PATENT DOCUMENTS

| | | | |
|---|---|---|---|
| 4,080,427 A | 3/1978 | Fujita et al. | |
| 4,614,645 A * | 9/1986 | Yoneda ................. | B01D 53/68 423/243.08 |

(Continued)

FOREIGN PATENT DOCUMENTS

| | | |
|---|---|---|
| CN | 202170277 U | 3/2012 |
| CN | 104707466 A | 6/2015 |

(Continued)

OTHER PUBLICATIONS

PE2E translation of CN-106587235-A.*

(Continued)

*Primary Examiner* — Jonathan Luke Pilcher
(74) *Attorney, Agent, or Firm* — Wiersch Law Group

(57) ABSTRACT

A desulfurization wastewater zero discharge treatment method and system suitable for multiple working conditions. A tail flue of a boiler and a bottom outlet of a wastewater drying tower are both communicated with an inlet of a dust collector; an outlet of the dust collector is communicated with flue gas inlets of a wastewater concentration tower and a desulfurization absorption tower; the wastewater concentration tower is communicated with the desulfurization absorption tower; the desulfurization absorption tower is communicated with a chimney; the desulfurization absorption tower is communicated with a gypsum cyclone; the gypsum cyclone is communicated with a filtrate water tank;

(Continued)

the gypsum cyclone is communicated with a gypsum dewatering machine; the gypsum dewatering machine is communicated with a gas liquid separating tank; and a flue gas port of the tail flue of the boiler is communicated with the flue gas inlet of the wastewater drying tower.

7 Claims, 1 Drawing Sheet

(51) Int. Cl.
| | |
|---|---|
| *B01D 53/14* | (2006.01) |
| *B01D 53/18* | (2006.01) |
| *B01D 53/50* | (2006.01) |
| *B01D 53/68* | (2006.01) |
| *B01D 53/80* | (2006.01) |
| *B01D 53/96* | (2006.01) |
| *C02F 1/04* | (2023.01) |
| *F23J 15/04* | (2006.01) |
| *C02F 103/18* | (2006.01) |
| *F23J 15/02* | (2006.01) |

(52) U.S. Cl.
CPC ......... *B01D 53/1481* (2013.01); *B01D 53/18* (2013.01); *B01D 53/502* (2013.01); *B01D 53/68* (2013.01); *B01D 53/96* (2013.01); *C02F 1/048* (2013.01); *C02F 1/16* (2013.01); *F23J 15/04* (2013.01); *B01D 2251/404* (2013.01); *B01D 2251/608* (2013.01); *B01D 2257/204* (2013.01); *C02F 2103/18* (2013.01); *F23J 15/022* (2013.01); *F23J 2215/20* (2013.01); *F23J 2219/50* (2013.01)

(56) References Cited

U.S. PATENT DOCUMENTS

| | | | | |
|---|---|---|---|---|
| 7,524,470 | B2 * | 4/2009 | Barger | B01D 53/508 |
| | | | | 423/243.08 |
| 7,625,537 | B2 * | 12/2009 | Rader | B01D 53/10 |
| | | | | 423/243.08 |
| 8,585,869 | B1 * | 11/2013 | Duesel, Jr. | C02F 1/048 |
| | | | | 203/79 |
| 9,115,895 | B2 * | 8/2015 | Okamoto | F23J 15/04 |
| 9,199,861 | B2 * | 12/2015 | Duesel, Jr. | B01D 1/14 |
| 9,527,004 | B2 * | 12/2016 | Fukuda | B01J 2/04 |
| 9,669,356 | B2 * | 6/2017 | Fukuda | B01D 53/501 |
| 9,700,839 | B2 * | 7/2017 | Fukuda | F23L 11/00 |
| 9,943,804 | B2 * | 4/2018 | Fukuda | B01D 53/75 |
| 10,138,139 | B2 * | 11/2018 | Kokkinos | C02F 1/12 |
| 10,247,414 | B2 * | 4/2019 | Imada | B01D 53/64 |
| 10,589,226 | B2 * | 3/2020 | Klidas | B01D 53/501 |
| 10,618,823 | B2 * | 4/2020 | Kokkinos | B01D 1/14 |
| 10,780,473 | B2 * | 9/2020 | Kamiyama | B09B 5/00 |
| 10,967,327 | B2 * | 4/2021 | Fukuda | F23J 15/04 |
| 11,325,850 | B2 * | 5/2022 | Kamiyama | B01D 53/32 |
| 2012/0237423 | A1 * | 9/2012 | Bialkin | B01D 53/346 |
| | | | | 423/240 R |
| 2014/0079615 | A1 * | 3/2014 | Honjo | B01D 53/96 |
| | | | | 423/235 |
| 2014/0083629 | A1 * | 3/2014 | Fukuda | B01J 2/04 |
| | | | | 159/4.02 |
| 2014/0216033 | A1 * | 8/2014 | Duesel, Jr. | C02F 1/048 |
| | | | | 159/47.1 |
| 2015/0352490 | A1 * | 12/2015 | Fukuda | F23J 15/04 |
| | | | | 423/243.08 |
| 2015/0360174 | A1 * | 12/2015 | Fukuda | B01D 53/505 |
| | | | | 422/168 |
| 2016/0096744 | A1 * | 4/2016 | Rutsch | C02F 1/048 |
| | | | | 60/657 |
| 2016/0367936 | A1 * | 12/2016 | Ukai | B01D 53/80 |
| 2017/0225121 | A1 * | 8/2017 | Fukuda | F23J 15/04 |
| 2018/0050302 | A1 * | 2/2018 | Kamiyama | B09B 5/00 |
| 2018/0180285 | A1 * | 6/2018 | Imada | B01D 53/505 |
| 2019/0270049 | A1 * | 9/2019 | Fukuda | B01D 1/18 |
| 2020/0071207 | A1 * | 3/2020 | Kamiyama | B01D 53/78 |

FOREIGN PATENT DOCUMENTS

| | | | | |
|---|---|---|---|---|
| CN | 105174584 | A | | 12/2015 |
| CN | 106277127 | A | | 1/2017 |
| CN | 205973869 | U | | 2/2017 |
| CN | 106587231 | A | | 4/2017 |
| CN | 106587235 | A * | | 4/2017 |
| CN | 206173009 | U * | | 5/2017 |
| CN | 206428024 | U * | | 8/2017 |
| CN | 107207286 | A | | 9/2017 |
| CN | 107739119 | A * | 2/2018 | .......... B01D 53/504 |
| CN | 108285188 | A * | 7/2018 | ............ B01D 45/12 |
| CN | 207713563 | U * | 8/2018 | |
| CN | 207713565 | U * | 8/2018 | |
| CN | 207933199 | U | | 10/2018 |
| CN | 109248558 | A | | 1/2019 |
| CN | 109607907 | A | | 4/2019 |
| CN | 109824190 | A * | | 5/2019 |
| CN | 110723858 | A | | 1/2020 |
| CN | 111056584 | A | | 4/2020 |
| CN | 111233239 | A | | 6/2020 |
| CN | 111285423 | A * | | 6/2020 |
| CN | 111320222 | A * | 6/2020 | ............. C02F 1/008 |
| EP | 2959959 | A1 | | 12/2015 |
| JP | 53138975 | A | | 12/1978 |
| JP | H02198613 | A | | 8/1990 |
| WO | 2014124078 | A2 | | 8/2014 |

OTHER PUBLICATIONS

PE2E translation of CN-206173009-U.*
PE2E translation of CN-206428024-U.*
PE2E translation of CN-107739119-A.*
PE2E translation of CN-108285188-A.*
PE2E translation of CN-207713565-U.*
PE2E translation of CN-109824190-A.*
PE2E translation of CN-111285423-A.*
PE2E translation of CN-111320222-A.*
PE2E translation of CN-207713563-U.*
International Search Report (PCT /CN2020/122579); Date of Mailing: May 19, 2021.
CN First Office Action(202010819367.1); Date of Mailing: Mar. 17, 2021.

* cited by examiner

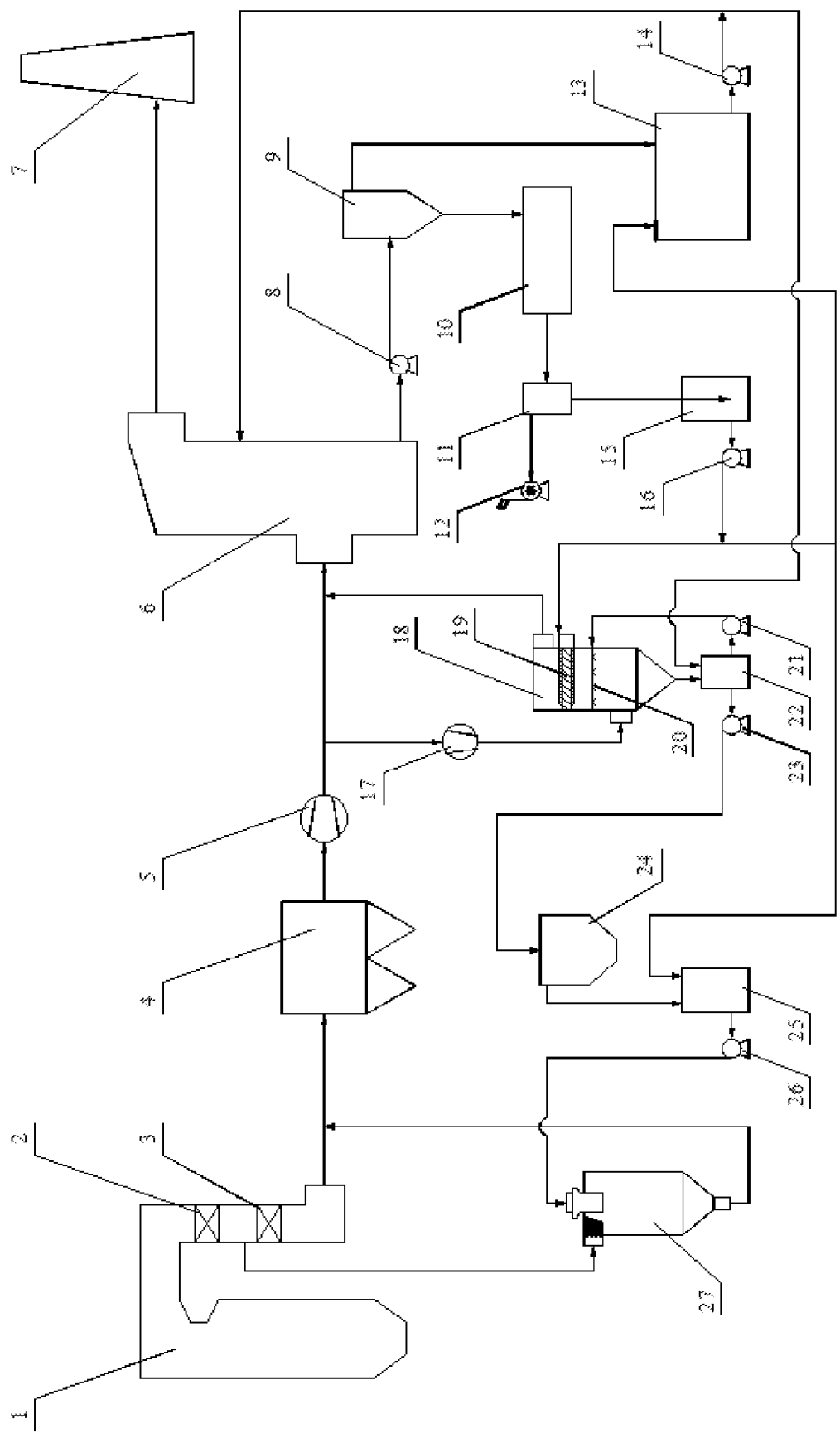

METHOD FOR ZERO DISCHARGE TREATMENT OF DESULFURIZATION WASTEWATER SUITABLE FOR MULTIPLE WORKING CONDITIONS

CROSS-REFERENCE TO RELATED APPLICATIONS

The present application is a continuation of International Application No. PCT/CN2020/122579, filed on Oct. 21, 2020, which claims priority to Chinese Application No. 202010819367.1, filed on Aug. 14, 2020, the contents of both of which are incorporated herein by reference in their entireties.

TECHNICAL FIELD

The present disclosure belongs to the technical field of wastewater treatment of wet flue gas desulfurization system, and relates to a method and system for zero discharge treatment of desulfurization wastewater suitable for multiple working conditions.

BACKGROUND

Wet flue gas desulfurization technology is widely used in the technical field of flue gas pollutant treatment. The sulfur dioxide $SO_2$ in flue gas is absorbed by an alkaline absorbent in the desulfurization absorption tower, forming desulfurized gypsum slurry. After most of the water in the gypsum slurry is removed by a gypsum cyclone and a gypsum dehydrator, the gypsum slurry becomes gypsum solids and is transported out for resource utilization. Acid pollutants such as hydrogen chloride HCl in the flue gas are absorbed together in the desulfurization absorption tower, and exist in the desulfurization slurry in the form of chloride ion $Cl^-$. It is difficult for Cl– and other substances in the desulfurization absorption tower to generate precipitates, and it is impossible to form solids to be discharged from the slurry. Coupled with $Cl^-$ carried by the process water entering the system, the concentration of $Cl^-$ in the desulfurization slurry is getting higher and higher. Excessive $Cl^-$ concentration will affect the performance of the desulfurization system and cause equipment corrosion, etc. Therefore, it is required to discharge a certain amount of the desulfurization slurry as wastewater out of the desulfurization system to achieve the purpose of discharging $Cl^-$ and keep the $Cl^-$ concentration in the desulfurization slurry within a range allowable by design.

The discharge of desulfurization wastewater is closely related to HCl concentration in the flue gas, the $Cl^-$ concentration of the process water, the boiler load, etc. The desulfurization wastewater is separated from the desulfurization slurry, and the generated amount of the desulfurization slurry is related to $SO_2$ concentration in the flue gas, the boiler load and the like. Due to the wide sources of fuel in boilers, fuels from different places are often burned. Slight changes of sulfur and chlorine in fuels will make the concentration of $SO_2$ and HCl in the flue gas produced by combustion different. Under different working conditions of boilers, the required desulfurization wastewater discharge amount and slurry production amount are different. The desulfurization wastewater treatment system should adjust the water source and treatment process of the desulfurization wastewater in time to ensure the low energy consumption operation of the desulfurization wastewater treatment system.

In a traditional desulfurization wastewater treatment system, the slurry of a desulfurization absorption tower is generally separated by a gypsum cyclone, and the overflow slurry of the gypsum cyclone is separated by a wastewater cyclone. The overflow slurry of the wastewater cyclone with a solid content of about 2-3% is used as the source of desulfurization wastewater, and then treated by triple box processes such as dosing, sedimentation and flocculation, and the supernatant is discharged out of the plant. In this solution, due to the high solid content in the overflow of the wastewater cyclone, the subsequent wastewater treatment system has many faults and a high operating cost, and the wastewater discharged to the outside of the plant has certain environmental pollution.

With the stricter requirements of environmental protection, many factories are not allowed to discharge desulfurization wastewater out of the factory, and the wastewater discharged outside the desulfurization system must be treated in the factory to realize zero discharge of desulfurization wastewater. It is an effective method to concentrate and dry the wastewater by using the waste heat of the boiler flue gas, which makes the water in desulfurization wastewater evaporate into the flue gas, and the ions in the wastewater crystallize into solid salts after the water evaporates, which are mixed into the boiler fly ash and collected by the dust collector and discharged out of the system. In this system, the waste heat of low-temperature flue gas is used by the wastewater concentration tower to evaporate the wastewater, which basically has no influence on the boiler efficiency. However, the power consumption of the wastewater concentration booster fan and the wastewater concentration circulating pump is high, which increases the treatment cost per ton of wastewater when the amount of water evaporated by the wastewater concentration tower is not large. The wastewater drying tower extracts the high-temperature flue gas in front of the air preheater to dry the wastewater, which will reduce the flue gas heat recovered by the air preheater and affect the boiler efficiency. Therefore, the amount of wastewater entering the drying tower should be reduced as much as possible, and when the amount of wastewater is large, it should be concentrated and reduced first. Moreover, the atomized particle size of desulfurization wastewater in the wastewater drying tower is very small, so it is required that the solid content of wastewater entering the drying tower is low, otherwise, problems such as equipment wear, scaling, blockage, etc. will easily occur. Therefore, although the waste heat of the flue gas is used to concentrate and dry the wastewater to realize the zero discharge of desulfurization wastewater, it is necessary to adjust the process flow in time according to the change of water quantity and water quality, so as to realize the low energy consumption and stable operation of the zero discharge system of desulfurization wastewater.

The description of the Chinese patent with the publication number of CN102343207A mentions a water intake mode of a wet flue gas desulfurization wastewater treatment system, and it is proposed that the desulfurization wastewater should be drained from the gas-liquid separation tank, and then enter the subsequent dosing, clarification and concentration treatment. However, the operation conditions considered are not comprehensive enough. When the concentration of $SO_2$ in flue gas is not high, the drainage amount of the gas-liquid separation tank is small, which will cause the problem of an insufficient source of desulfurization wastewater. Moreover, the desulfurization wastewater in this description is treated by subsequent dosing, clarification and concentration, which does not realize zero discharge of desulfurization wastewater, and the requirements for water intake and water quality are not as strict as those for zero discharge of desulfurization wastewater.

SUMMARY

The purpose of the present disclosure is to overcome the above shortcomings of the prior art, and provide a method and system for zero discharge treatment of desulfurization wastewater suitable for multiple working conditions. The method and system can be suitable for the treatment of various flue gas components, and have the characteristics of high reliability, energy saving and economy.

In order to achieve the above purpose, the present disclosure adopts the following technical solution:

A method for zero discharge treatment of desulfurization wastewater suitable for multiple working conditions, including the following steps:

High-temperature flue gas generated by a boiler passing through an economizer and an air preheater for heat recovery, and then entering a dust collector for dust removal, then entering a desulfurization absorption tower to remove acidic pollutants, and finally being discharged through a chimney; gypsum slurry generated by the desulfurization absorption tower entering a gypsum cyclone for separation. The separated overflow slurry enters a filtrate water tank, and the separated underflow slurry enters a gypsum dehydrator for dehydration; the water in the slurry in the gypsum dehydrator entering a gas-liquid separation tank for gas-liquid separation after being filtered by a filter cloth of the dehydrator. The separated drainage water enters a wastewater collection tank.

When a concentration of HCl in the flue gas is less than a preset HCl concentration value, a required amount of desulfurization wastewater is small, and when an amount of the drainage water currently output by the gas-liquid separation tank is higher than the amount of the desulfurization wastewater required to be discharged, the drainage water collected by the wastewater collection tank is divided into two paths one of which passes through the filtrate water tank and enters the desulfurization absorption tower, and the other is fed into a wastewater drying tower through a spray water tank; at the same time, the high-temperature flue gas is pumped through a flue gas port and fed into the wastewater drying tower, and the drainage water in the wastewater drying tower is evaporated by the high-temperature flue gas so that the water in the drainage water evaporates into the flue gas, and the flue gas output from the wastewater drying tower enters the dust collector for dust removal.

When the concentration of HCl in the flue gas is greater than or equal to the preset HCl concentration value, and a concentration ratio of $SO_2$ to HCl in the flue gas is greater than or equal to a preset ratio, the amount of the desulfurization wastewater required to be discharged and the amount of the produced gypsum slurry are relatively large, and when the amount of the drainage water currently output by the gas-liquid separation tank is greater than or equal to the amount of the desulfurization wastewater required to be discharged, part of the drainage water in the wastewater collection tank is fed into the wastewater concentration tower, and the remaining wastewater in the wastewater collection tank is fed into the filtrate water tank and then into the desulfurization absorption tower; at the same time, a path of the flue gas output from the dust collector is led out and fed into the wastewater concentration tower for countercurrent contact with the desulfurization wastewater in the wastewater concentration tower, so that the desulfurization wastewater in the wastewater concentration tower is reduced and solid content thereof is increased; the flue gas in the wastewater concentration tower entering the desulfurization absorption tower after being treated by a mist eliminator, and the slurry at the bottom of the wastewater concentration tower entering a thick slurry tank, the slurry in the thick slurry tank entering the spray water tank after being clarified by a clarifier and then entering the wastewater drying tower for evaporation and drying treatment.

When the concentration of HCl in the flue gas is greater than or equal to the preset HCl concentration value, and the concentration ratio of $SO_2$ to HCl in the flue gas is less than the preset ratio, the amount of the desulfurization wastewater to be discharged is large, and when the amount of the drainage water output from the gas-liquid separation tank is less than the amount of the desulfurization wastewater to be discharged, all the drainage water in the wastewater collection tank is transported to the wastewater concentration tower, and then part of the slurry in the filtrate water tank is fed into the thick slurry tank; the two parts of the slurry are evaporated, reduced and concentrated in the wastewater concentration tower, and then enter the clarifier; the supernatant in the clarifier enters the spray water tank, and then is fed into the wastewater drying tower for evaporation.

In the above steps, the preset HCl concentration value is determined according to the concentration of the process water, the boiler load, etc., and is preferably 7-13 ppm. When the HCl concentration in the flue gas is less than the preset value, the amount of the desulfurization wastewater is small; when the HCl concentration in the flue gas is greater than or equal to the preset value, the amount of the desulfurization wastewater is larger.

In the above steps, the preset ratio of the concentration ratio of $SO_2$ to HCl in the flue gas is determined according to the Cl concentration of the process water, the boiler load, the operating conditions of the gypsum cyclone, the gypsum dehydrator and the gas-liquid separation tank, etc., and is preferably 20-30. When the concentration ratio of $SO_2$ to HCl in the flue gas is greater than or equal to the preset value, the amount of the drainage water output from the gas-liquid separation tank is greater than or equal to the amount of the desulfurization wastewater required to be discharged; when the concentration ratio of $SO_2$ to HCl in the flue gas is less than the preset value, the amount of the drainage water output from the gas-liquid separation tank is less than the required amount of the desulfurization wastewater.

In the above steps, the high-temperature flue gas pumped into the wastewater drying tower is taken after the boiler economizer and before the air preheater.

In the above steps, salts formed by the evaporation of the wastewater in the wastewater drying tower enter the dust collector with the flue gas and are collected.

In the above steps, the drainage water in the wastewater collection tank enters the wastewater concentration tower as washing water of the mist eliminator.

In the above steps, the wastewater is clarified and tempered in the clarifier.

A system for zero discharge treatment of desulfurization wastewater suitable for multiple working conditions according to the present disclosure includes a boiler, a dust collector, a desulfurization absorption tower, a chimney, a gypsum cyclone, a filtrate water tank, a gypsum dehydrator, a gas-liquid separation tank, a wastewater collection tank, a wastewater concentration tower, a thick slurry tank, a clarifier, a spray water tank and a wastewater drying tower.

An economizer and an air preheater are arranged in a tail flue of the boiler along a flow direction of flue gas, the tail flue of the boiler and a bottom outlet of the wastewater drying tower are both communicated with an inlet of a dust collector, an outlet of the dust collector is communicated with a flue gas inlet of the wastewater concentration tower and a flue gas inlet of the desulfurization absorption tower; a flue gas outlet of the desulfurization absorption tower is communicated with the chimney, a bottom slurry discharge outlet of the desulfurization absorption tower is communicated with an inlet of the gypsum cyclone through a gypsum discharge pump, an overflow slurry outlet of the gypsum cyclone is communicated with an inlet of the filtrate water tank, and an underflow slurry outlet of the gypsum cyclone is connected with an inlet of the gypsum dehydrator.

ASn exhaust outlet of the gypsum dehydrator is communicated with an inlet of the gas-liquid separation tank, an exhaust port of the gas-liquid separation tank is connected with a vacuum pump, and a drain port of the gas-liquid separation tank is communicated with an inlet of the wastewater collection tank; an outlet of the wastewater collection tank is communicated with a flushing water inlet of the mist eliminator in the wastewater concentration tower, an inlet of the spray water tank and an inlet of the filtrate water tank through a wastewater delivery pump, and an outlet of the filtrate water tank is communicated with a slurry reflux port of the desulfurization absorption tower and an inlet of the thick slurry tank through a filtrate water pump.

A bottom outlet of the wastewater concentration tower is communicated with the inlet of the thick slurry tank, an outlet of the thick slurry tank is communicated with an inlet of a spray layer in the wastewater concentration tower and an inlet of the clarifier, a supernatant outlet of the clarifier is communicated with the inlet of the spray water tank, and an outlet of the spray water tank is communicated with an inlet of the wastewater drying tower through a spray water pump; the tail flue of the boiler is provided with a flue gas port. The flue gas port is communicated with a flue gas inlet of the wastewater drying tower and located between the economizer and the air preheater.

The outlet of the dust collector is divided into two paths after an induced draft fan, one of which is communicated with the flue gas inlet of the desulfurization absorption tower, and the other is communicated with the flue gas inlet of the wastewater concentration tower through a wastewater concentration booster fan.

The outlet of the thick slurry tank is communicated with the spray layer in the wastewater concentration tower through a circulating pump, and the outlet of the thick slurry tank is communicated with the inlet of the clarifier through a thick slurry pump.

Compared with the prior art, the present disclosure has the following beneficial effects:

The method and system for zero discharge treatment of desulfurization wastewater suitable for multiple working conditions provided by the present disclosure are not provided with wastewater purification treatment equipment such as a wastewater cyclone and a triple box during specific operation, so that the system is simple, and there are few equipment failures; meanwhile, the drainage water of the gas-liquid separation tank is preferentially used as the source of desulfurization wastewater, and the solid content of the drainage water of the gas-liquid separation tank is as low as 0.5%; and the water quality condition not only meets the washing requirements of the mist eliminator of the wastewater concentration tower, but also meets the requirements of the wastewater drying tower on the solid content of incoming water, and the subsequent treatment mode is more flexible.

In addition, when the concentration of HCl in the flue gas is low, the amount of desulfurization wastewater required to be discharged is small, and the collected drainage water from the gas-liquid separation tank is directly transported to the spray water tank for subsequent drying, thus saving the wastewater concentration process. Meanwhile, the drainage water from the gas-liquid separation tank is taken as the source of desulfurization wastewater, which has low solid content, thus saving the process of wastewater clarification, and the system reliability is high.

In addition, when the concentration of HCl in the flue gas is high, a large amount of desulfurization wastewater is required to be discharged. The wastewater is concentrated and reduced by low-temperature flue gas, and then evaporated by high-temperature flue gas, which makes use of the waste heat resources of low-temperature flue gas. When the concentration of $SO_2$ in the flue gas is high, the amount of drainage water of the gas-liquid separation tank can meet the wastewater discharge requirements. The drainage water of the gas-liquid separation tank is taken as a source of desulfurization wastewater, the solid content of the desulfurization wastewater is low, and the operation reliability of the wastewater concentration tower, the clarifier, the wastewater drying tower and the like is high. Moreover, the drainage water of the gas-liquid separation tank with a low solid content can be used as the flushing water of the mist eliminator, and it is not necessary to introduce process water to flush the mist eliminator, so as to avoid the increase of the required evaporated water quantity caused by the additional increase of the water inflow of the wastewater concentration tower, so as to maintain the low energy consumption of the system.

In addition, when the concentration of HCl in the flue gas is high, but the concentration of $SO_2$ in the flue gas is low, the amount of drainage water of the gas-liquid separation tank is smaller than the required amount of desulfurization wastewater, so two paths of desulfurization wastewater will be introduced from the wastewater collection tank and filtrate water tank, and led to the wastewater concentration tower and thick slurry tank respectively, which not only ensures enough amount of desulfurization wastewater, but also avoids the pollution of drainage water of the gas-liquid separation tank with a low solid content caused by premature mixing of the two water sources, and ensures that the drainage water of the gas-liquid separation tank can be used as the washing water of the mist eliminator of the concentration tower.

Finally, it needs to be explained that the present disclosure has strong adaptability to flue gas components, and different zero discharge treatments of desulfurization wastewater are proposed for different flue gas components, which can ensure the high reliability and energy saving of the system under different working conditions.

BRIEF DESCRIPTION OF DRAWINGS

FIG. 1 is a schematic structural diagram of the present disclosure.

In the FIGURE: 1—Boiler, 2—Economizer, 3—Air preheater, 4—Dust collector, 5—Induced draft fan, 6—Desulfurization absorption tower, 7—Chimney, 8—Gypsum discharge pump, 9—Gypsum cyclone, 10—Gypsum dehydrator, 11—Gas-liquid separation tank, 12—Vacuum pump, 13—Filtrate water tank and 14—Filtrate water pump, 15—Wastewater collection tank, 16—Wastewater delivery pump, 17—Wastewater concentration booster fan, 18—Wastewater concentration tower, 19—Mist eliminator, 20—Spray layer, 21—Circulating pump, 22—Thick slurry tank, 23—Thick slurry pump, 24—Clarifier, 25—Spray water tank, 26—Spray water pump, 27—Wastewater drying tower.

DESCRIPTION OF EMBODIMENTS

In order to make people in the technical field better understand the solution of the present disclosure, the technical solution in the embodiments of the present disclosure will be described clearly and completely below with reference to the drawings in the embodiments of the present disclosure. Obviously, the described embodiments are only part of the embodiments of the present disclosure, not all of them, and are not intended to limit the scope of the present disclosure. In addition, in the following description, descriptions of well-known structures and technologies are omitted to avoid unnecessarily obscuring the concepts disclosed in the present disclosure. Based on the embodiments of the present disclosure, all other embodiments obtained by those skilled in the art without creative labor should belong to the scope of the present disclosure.

Various structural schematic diagrams according to the disclosed embodiments of the present disclosure are shown in the drawings. These FIGURES are not drawn to scale, in which some details are exaggerated and may be omitted for the sake of clarity. The shapes of various regions and layers shown in the FIGURE, and their relative sizes and positional relationships are only exemplary. In practice, there may be deviations due to manufacturing tolerances or technical limitations, and those skilled in the art can additionally design regions/layers with different shapes, sizes and relative positions according to actual needs.

In the context of the present disclosure, when a layer/element is referred to as being "on" another layer/element, the layer/element may be directly on the other layer/element, or there may be an intermediate layer/element between them. In addition, if one layer/element is "on" another layer/element in one orientation, the layer/element can be "below" the other layer/element when the orientation is turned.

It should be noted that the terms "first" and "second" in the description and claims of the present disclosure and the above drawings are used to distinguish similar objects, and are not necessarily used to describe a specific order or sequence. It should be understood that the data used in this way can be interchanged under appropriate circumstances, so that the embodiments of the present disclosure described here can be implemented in a sequence other than those illustrated or described here. In addition, the terms "including" and "having" and any variations thereof are intended to cover non-exclusive inclusion. For example, a process, method, system, product or device that includes a series of steps or units is not necessarily limited to those steps or units that are clearly listed, but may include other steps or units that are not clearly listed or inherent to these processes, methods, products or devices.

The present disclosure will be further described in detail with reference to the following drawings:

Referring to FIG. 1, the system for zero discharge treatment of desulfurization wastewater suitable for multiple working conditions according to the present disclosure includes a boiler 1, a dust collector 4, a desulfurization absorption tower 6, a chimney 7, a gypsum cyclone 9, a filtrate water tank 13, a gypsum dehydrator 10, a gas-liquid separation tank 11, a wastewater collection tank 15, a wastewater concentration tower 18, a thick slurry tank 22, a clarifier 24, a spray water tank 25 and a wastewater drying tower 27. An economizer 2 and an air preheater 3 are arranged in a tail flue of the boiler 1 along a flow direction of flue gas, the tail flue of the boiler 1 and a bottom outlet of the wastewater drying tower 27 are both communicated with an inlet of a dust collector 4, an outlet of the dust collector 4 is communicated with a flue gas inlet of the wastewater concentration tower 18 and a flue gas inlet of the desulfurization absorption tower 6; a flue gas outlet of the desulfurization absorption tower 6 is communicated with the chimney 7, a bottom slurry discharge outlet of the desulfurization absorption tower 6 is communicated with an inlet of the gypsum cyclone 9 through a gypsum discharge pump 8, an overflow slurry outlet of the gypsum cyclone 9 is communicated with an inlet of the filtrate water tank 13, and an underflow slurry outlet of the gypsum cyclone 9 is connected with an inlet of the gypsum dehydrator 10; an exhaust outlet of the gypsum dehydrator 10 is communicated with an inlet of the gas-liquid separation tank 11, an exhaust port of the gas-liquid separation tank 11 is connected with a vacuum pump 12, and a drain port of the gas-liquid separation tank 11 is communicated with an inlet of the wastewater collection tank 15; an outlet of the wastewater collection tank 15 is communicated with a flushing water inlet of the mist eliminator 19 in the wastewater concentration tower 18, an inlet of the spray water tank 25 and an inlet of the filtrate water tank 13 through a wastewater delivery pump 16, and an outlet of the filtrate water tank 13 is communicated with a slurry reflux port of the desulfurization absorption tower 6 and an inlet of the thick slurry tank 22 through a filtrate water pump 14; a bottom outlet of the wastewater concentration tower 18 is communicated with the inlet of the thick slurry tank 22, an outlet of the thick slurry tank 22 is communicated with an inlet of a spray layer 20 in the wastewater concentration tower 18 and an inlet of the clarifier 24, a supernatant outlet of the clarifier 24 is communicated with the inlet of the spray water tank 25, and an outlet of the spray water tank 25 is communicated with an inlet of the wastewater drying tower 27 through a spray water pump 26; the tail flue of the boiler 1 is provided with a flue gas port. The flue gas port is communicated with a flue gas inlet of the wastewater drying tower 27 and located between the economizer 2 and the air preheater 3.

The outlet of the dust collector 4 is divided into two paths after an induced draft fan 5, one of which is communicated with the flue gas inlet of the desulfurization absorption tower 6, and the other is communicated with the flue gas inlet of the wastewater concentration tower 18 through a wastewater concentration booster fan 17.

The outlet of the thick slurry tank 22 is communicated with the spray layer 20 in the wastewater concentration tower 18 through a circulating pump 21, and the outlet of the thick slurry tank 22 is communicated with the inlet of the clarifier 24 through a thick slurry pump 23; the outlet of the spray water tank 25 is communicated with the inlet of the top of the wastewater drying tower 27 through a spray water pump 26.

The method for zero discharge treatment of desulfurization wastewater suitable for multiple working conditions is as follows:

In this embodiment, the boiler 1 used fuels from three producing areas A, B and C respectively, and the concentration of $Cl^-$ in the process water entering the desulfurization system was 150 mg/L.

The high-temperature flue gas produced by the boiler 1 passed through an economizer 2 and an air preheater 3 for heat recovery. After the flue gas temperature was reduced to about 90° C., it entered a dust collector 4 for dust removal, and then was transported to a desulfurization absorption tower 6 through induced draft fan 5 to remove acid pollutants such as sulfur dioxide $SO_2$ and hydrogen chloride HCl. After the flue gas temperature was further reduced to about 50° C., the flue gas was discharged from chimney 7.

The gypsum slurry produced in the desulfurization absorption tower 6 was transported to the gypsum cyclone 9 by a gypsum discharge pump 8 for separation, in which the separated overflow slurry with a solid content of about 5% entered a filtrate water tank 13, and the separated underflow slurry with a solid content of about 50% entered a gypsum dehydrator 10. Through the suction effect of a vacuum pump 12, the water in the slurry in the gypsum dehydrator 10 was filtered through the filter cloth of the dehydrator, and then entered a gas-liquid separation tank 11 along with the sucked air, and the separated drainage water with a solid content of about 0.5% entered a wastewater collection tank 15.

When the fuel from the area A was burned in the boiler 1, the concentrations of HCl and $SO_2$ in the flue gas were 7 ppm and 750 ppm respectively, the flue gas volume at the inlet of the desulfurization absorption tower 6 was 2,960,069 $m^3$/h (in a standard state), the amount of the desulfurization wastewater required to be discharged was 2.7 $m^3$/h, and the amount of the drainage water of the gas-liquid separation tank 11 was 11.5 $m^3$/h; 2.7 $m^3$/h of the drainage water collected by the wastewater collection tank 15 was directly transported to a spray water tank 25 by a wastewater delivery pump 16, and then transported to a wastewater drying tower 27 by a spray water pump 26; the flue gas of about 350° C. before the air preheater 3 was extracted to evaporate the desulfurized wastewater in the wastewater drying tower 27, and the amount of the extracted flue gas was 27,000 $m^3$/h (in a standard state). After the water evaporates, it entered the dust collector 4 along with the flue gas. The salts formed by evaporation of wastewater entered the dust collector 4 along with the flue gas to be collected, and the excess 8.8 $m^3$/h of the drainage water in the wastewater collection tank 15 was transported to the filtrate water tank 13, and then returned to the desulfurization absorption tower 6 through a filtrate water pump 14. In this embodiment, the amount of the desulfurization wastewater required to be discharged was small, and the collected drainage water output from the gas-liquid separation tank 11 was directly transported to the spray water tank 25 for drying, thus omitting the wastewater concentration process, and the system structure was relatively simple; moreover, the drainage water output from the gas-liquid separation tank 11 was taken as the source of desulfurization wastewater, and its solid content was as low as 0.5%, which could save the process of wastewater clarification and tempering; under this working condition, it not only saved energy, but also had high system reliability.

When the fuel from the area B was burned in the boiler 1, the concentrations of HCl and $SO_2$ in the flue gas were 18.5 ppm and 1250 ppm respectively, and the amount of the flue gas at the inlet of the desulfurization absorption tower 6 was 2,826,051 $m^3$/h (in a standard state); the amount of desulfurization wastewater required to be discharged was 6.0 $m^3$/h, and the amount of the drainage water of the gas-liquid separation tank 11 was 18.0 $m^3$/h, and 6.0 $m^3$/h of the drainage water collected by the waste water collection tank 15 was transported by the waste water delivery pump 16, and entered the waste water concentration tower 18 as the washing water of a mist eliminator 19; the excess 12 $m^3$/h of the drainage water in the wastewater collection tank 15 was transported to the filtrate water tank 13, and then returned to the desulfurization absorption tower 6 through the filtrate water pump 14. The desulfurization wastewater was transported to a spray layer 20 by a circulating pump 21 in the wastewater concentration tower 18 and sprayed out in the form of droplets. At the same time, the low-temperature boiler flue gas of about 90° C. was led out from an induced draft fan 5 and entered the wastewater concentration tower 18. The flue gas of 190,000 $m^3$/h (in a standard state) was transported to the wastewater concentration tower 18 by a wastewater concentration booster fan 17, and contacted with the sprayed desulfurization wastewater droplets in countercurrent, and some water in the droplets entered the flue gas by evaporation. The amount of the desulfurized wastewater was reduced to 2.0 $m^3$/h, with an increased solid content, and then entered a thick slurry tank 22, and was transported to a clarifier 24 by a thick slurry pump 23 for clarification and tempering. The supernatant in the clarifier 24 flows into the spray water tank 25, and then was transported to the wastewater drying tower 27 by the spray water pump 26 for evaporation. 20,000 $m^3$/h (in a standard state) of the high-temperature flue gas of about 350° C. was taken. The flue gas contacted with the droplets in the wastewater concentration tower 18 not only contained evaporated water vapor, but also carried some desulfurization wastewater droplets. The droplets were collected by the mist eliminator 19, and the flue gas output from the top of the wastewater concentration tower 18 entered the desulfurization absorption tower 6. In this embodiment, a large amount of desulfurization wastewater was required to be discharged, the wastewater was concentrated and reduced by using low-temperature flue gas of about 90° C., and then evaporated by using high-temperature flue gas of about 350° C. The waste heat resources of low-temperature flue gas were utilized, and the overall energy consumption of the system was low. In this embodiment, the drainage water output from the gas-liquid separation tank 11 met the wastewater discharge requirements, and the drainage water output from the gas-liquid separation tank 11 was used as the source of desulfurization wastewater, so that the desulfurization wastewater had a low solid content, and the operation reliability of the wastewater concentration tower 18, the clarifier 24 and the wastewater drying tower 27 was high. Besides, the drainage water with a low solid content could be used as the washing water of the mist eliminator 19, and it was not necessary to introduce process water to wash the mist eliminator 19, so as to avoid the increase of required evaporated water due to the additional water intake of the wastewater concentration tower 18, so as to maintain the low energy consumption of the system.

When the fuel from the area C was burned in the boiler 1, the concentrations of HCl and $SO_2$ in flue gas were 30.0 ppm and 590 ppm respectively, and amount of the flue gas at the inlet of desulfurization absorption tower 6 was 2,826,933 $m^3$/h (standard state). The amount of desulfurization wastewater required to be discharged was 9.5 $m^3$/h, and the amount of the drainage water in the gas-liquid separation tank 11 was 8.9 $m^3$/h. The amount of the drainage water of the gas-liquid separation tank 11 was smaller than the amount of desulfurization wastewater required to be discharged, and 8.9 $m^3$/h of the drainage water collected in the waste water collection tank 15 was all delivered to the waste water concentration tower 18 by the waste water delivery pump 16, and was used as the washing water of the mist eliminator 19; 0.6 $m^3$/h of the slurry was drawn from the filtrate water tank 13 and transported to the thick slurry tank 22 by the filtrate water pump 14; these two portions of slurry were evaporated, reduced and concentrated in the wastewater concentration tower 18, and low-temperature flue gas of about 90° C. of 285,000 m³/h (in a standard state) was extracted to reduce the desulfurization wastewater to 3.5 m3/h, and then transported to the clarifier 24 by the thick slurry pump 23; the supernatant in the clarifier 24 flowed into the spray water tank 25 by itself, and was transported to the wastewater drying tower 27 by the spray water pump 26 for evaporation, and 35,000 m3/h (in a standard state) of the high-temperature flue gas of about 350° C. was taken. In this embodiment, the hydrophobic quantity of the gas-liquid separation tank 11 was smaller than that of the desulfurization wastewater required to be discharged. Two paths of desulfurization wastewater introduced from the wastewater collection tank 15 and filtrate water tank 13 were respectively led to the wastewater concentration tower 18 and the thick slurry tank 22, which not only ensured enough desulfurization wastewater discharge, but also avoided the hydrophobic pollution of the gas-liquid separation tank 11 with a low solid content caused by premature mixing of the two water sources, and ensured that the drainage water of the gas-liquid separation tank 11 could be used as the washing water of the mist eliminator 19.

The present disclosure has strong adaptability to flue gas components, and provides different zero discharge treatment methods of desulfurization wastewater for different flue gas components, which can ensure the high reliability and energy-saving and economic operation of the system under different working conditions.

The above contents are only used to illustrate the technical concept of the present disclosure, and are not intended to limit the protection scope of the present disclosure. Any changes made on the basis of the technical solution according to the technical concept put forward by the present disclosure shall fall within the protection scope of the claims of the present disclosure.

What is claimed is:

1. A method for zero discharge treatment of desulfurization wastewater suitable for multiple working conditions, comprising following steps:
    recovering heat from high-temperature flue gas generated by a boiler (1) through an economizer (2) and an air preheater (3), feeding the high-temperature flue gas into a dust collector (4) for dust removing, then flowing the high-temperature flue gas into a desulfurization absorption tower (6) to remove acidic pollutants, and discharging the high-temperature flue gas through a chimney (7); separating a gypsum slurry generated by the desulfurization absorption tower (6) in a gypsum cyclone (9), wherein a separated overflow slurry is fed into a filtrate water tank (13) by the gypsum cyclone (9), and a separated underflow slurry enters a gypsum dehydrator (10) for dehydration by the gypsum cyclone (9); and filtering, by a filter cloth of the dehydrator, a water from the separated underflow slurry in the gypsum dehydrator (10), and feeding the filtered water into a gas-liquid separation tank (11) for gas-liquid separation, wherein a separated drainage water is fed into a wastewater collection tank (15) by the gypsum dehydrator (10);
    under a condition that a concentration of HCl in the high-temperature flue gas is less than a preset HCl concentration value, when an amount of a drainage water currently output by the gas-liquid separation tank (11) is greater than an amount of the desulfurization wastewater required to be discharged, dividing a drainage water collected by the wastewater collection tank (15) into two paths, wherein one path of the drainage water passes through the filtrate water tank (13) and enters the desulfurization absorption tower (6), and the other path of the drainage water is fed into a wastewater drying tower (27) through a spray water tank (25); at the same time, pumping, by a flue gas port, the high-temperature flue gas to the wastewater drying tower (27) for steam drying treatment, evaporating a water in the drainage water into the high-temperature flue gas, and directing the high-temperature flue gas output from the wastewater drying tower (27) to the dust collector (4) for dust removal;
    under conditions that the concentration of HCl in the high-temperature flue gas is greater than or equal to the preset HCl concentration value, and a concentration ratio of $SO_2$ to HCl in the high-temperature flue gas is greater than or equal to a preset ratio, when the amount of the drainage water currently output by the gas-liquid separation tank (11) is greater than or equal to the amount of the desulfurization wastewater required to be discharged, feeding part of the drainage water in the wastewater collection tank (15) into a wastewater concentration tower (18), feeding a remaining wastewater in the wastewater collection tank (15) into the filtrate water tank (13) and then into the desulfurization absorption tower (6); at the same time, directing a path of the high-temperature flue gas output from the dust collector (4) to the wastewater concentration tower (18) for countercurrent contact with a desulfurization wastewater in the wastewater concentration tower (18) to reduce the desulfurization wastewater in the wastewater concentration tower (18) and increase solid content thereof; treating the high-temperature flue gas in the wastewater concentration tower (18) through a mist eliminator (19) before entering the desulfurization absorption tower (6), and feeding a slurry at a bottom of the wastewater concentration tower (18) into a thick slurry tank (22), feeding a slurry in the thick slurry tank (22) into the spray water tank (25) after being clarified by a clarifier (24) and then feeding a slurry in the spray water tank (25) to the wastewater drying tower (27) for evaporation and drying treatment; and
    under conditions that the concentration of HCl in the high-temperature flue gas is greater than or equal to the preset HCl concentration value, and the concentration ratio of $SO_2$ to HCl in the high-temperature flue gas is less than the preset ratio, when the amount of the drainage water currently output from the gas-liquid separation tank (11) is less than the amount of the desulfurization wastewater required to be discharged, transporting all the drainage water in the wastewater collection tank (15) to the wastewater concentration tower (18), and then feeding part of the separated overflow slurry from the filtrate water tank (13) into the thick slurry tank (20); evaporating, reducing, and concentrating two parts of the slurry in the wastewater concentration tower (18), and then directing the two parts of the slurry to the clarifier (24); sending a supernatant from the clarifier (24) to the spray water tank (25), and then to the wastewater drying tower (27) for evaporation and drying.

2. The method for zero discharge treatment of desulfurization wastewater suitable for multiple working conditions according to claim 1, wherein the preset HCl concentration value is 7-13 ppm.

3. The method for zero discharge treatment of desulfurization wastewater suitable for multiple working conditions according to claim 1, wherein a preset ratio of the concentration ratio of $SO_2$ to HCl in the high-temperature flue gas is 20-30.

4. The method for zero discharge treatment of desulfurization wastewater suitable for multiple working conditions according to claim 1, wherein the high-temperature flue gas pumped by a flue gas port is taken after the economizer (2) and before the air preheater (3).

5. The method for zero discharge treatment of desulfurization wastewater suitable for multiple working conditions according to claim 1, wherein salts formed by the evaporation of the wastewater in the wastewater drying tower (27) enter the dust collector (4) with the high-temperature flue gas and are collected.

6. The method for zero discharge treatment of desulfurization wastewater suitable for multiple working conditions according to claim 1, wherein the drainage water in the wastewater collection tank (15) enters the wastewater concentration tower (18) as washing water of the mist eliminator (19).

7. The method for zero discharge treatment of desulfurization wastewater suitable for multiple working conditions according to claim 1, wherein the desulfurization wastewater required to be discharged is clarified and tempered in the clarifier (24).

* * * * *